United States Patent [19]

Cerise et al.

[11] 4,197,323

[45] Apr. 8, 1980

[54] PROCESS FOR THE PRODUCTION OF A TEXTURED PROTEIN-CONTAINING EDIBLE PRODUCT

[75] Inventors: Léon Cerise, Blonay; Sven Heyland, Saint-Légier, both of Switzerland

[73] Assignee: Societe d'Assistance Technique pour Produits Nestle S.A., Lausanne, Switzerland

[21] Appl. No.: 942,472

[22] Filed: Sep. 15, 1978

[30] Foreign Application Priority Data

Sep. 29, 1977 [CH] Switzerland ............... 11887/77

[51] Int. Cl.² .................................................. A23J 3/00
[52] U.S. Cl. ................................... 426/104; 426/276; 426/512; 426/802
[58] Field of Search ............ 426/104, 407, 656, 454, 426/802, 276, 657, 92, 512, 93, 517; 99/450.1, 516, 483

[56] References Cited

U.S. PATENT DOCUMENTS

| | | | |
|---|---|---|---|
| 2,776,212 | 1/1957 | Andregg | 426/276 |
| 3,210,195 | 10/1965 | Kjelson et al. | 426/104 |
| 3,920,853 | 11/1975 | Middendorf et al. | 426/512 X |
| 3,973,044 | 8/1976 | Giddey et al. | 426/517 X |
| 3,988,485 | 10/1976 | Hibbert et al. | 426/517 X |
| 3,993,794 | 11/1976 | Bernardin | 426/517 X |
| 4,042,715 | 8/1977 | Wegner et al. | 426/104 |
| 4,073,962 | 2/1978 | Spata et al. | 426/802 X |
| 4,103,034 | 7/1978 | Ronai et al. | 426/512 X |
| 4,118,520 | 10/1978 | Visser et al. | 426/657 X |
| 4,125,634 | 11/1978 | Plaskett | 426/276 X |

*Primary Examiner*—Kenneth M. Schor
*Attorney, Agent, or Firm*—Watson, Leavenworth, Kelton & Taggart

[57] ABSTRACT

The invention is concerned with a process for the production of a textured protein-containing edible product resembling cooked meat from a fibrous protein material without the use of a binder, in which the proteins are spun, the fibres obtained are subjected to a combined pressing and dehydrating operation in a mould, impregnated with a solution of aroma precursors and sterilized in a container. The process is characterized in that, with the fibres arranged substantially parallel to one another in the mould, the combined pressing and dehydrating operation is carried out by subjecting the fibres to mechanical compression in the axial direction.

24 Claims, No Drawings

PROCESS FOR THE PRODUCTION OF A TEXTURED PROTEIN-CONTAINING EDIBLE PRODUCT

This invention relates to a process for the production of a textured protein-containing edible product resembling slices or pieces of cooked meat, particularly beef, and to the product thus obtained.

For this type of product to be acceptable as a food, its appearance, composition, texture, colour and flavour must be very similar to those of cooked meat. Its production costs also have to be competitive with natural meat. There are various processes for texturing proteins. The principal methods are extrusion and spinning.

Cooking combined with extrusion (cooking-extrusion) is a recent development in texturing technology and, from a paste containing vegetable proteins, leads to expanded dehydrated products which, after rehydration, have an appearance, chewing characteristics and organoleptic properties comparable with those of cooked minced beefsteak.

Thus, according to published French patent application No. 2,206,912, a mixture of vegetable proteins, water, aroma precursors and other ingredients is introduced into a cooker-extruder in which it is subjected to the action of heat and pressure, extruded and the sausage-like product obtained expanded on entry into a reduced pressure zone to form a fibrous structure.

Another cooking-extrusion technique provides for the manufacture of products having a muscle-like texture in which the fibrous structure is not expanded or is only expanded to a minimal extent. For example, according to published French patent application No. 2,320,061, strips of a fibrous protein-containing product are obtained by forcing a flavoured paste into a heated extrusion duct by means of an Archimedean screw, this paste being discharged in the form of a ribbon under a low pressure gradient. The strips thus obtained are soaked in a binder, stacked and the binder thermally coagulated.

The technique of spinning enables the fibrous structure of the muscle to be reproduced with even better results by the formation of individual fibres. Its application to the production of meat analogs may be illustrated by published French patent application No. 2,121,742, according to which the fibres are grouped to form bundles or bands, the bundles or bands thus formed are impregnated with an emulsion containing aroma precursors, flavour strengtheners, a binder, a fat, etc., the bundles or bands thus impregnated are surface-coagulated, stacked, agglomerated under low pressure and the assemblages thus obtained are cooked.

Accordingly, it can be seen that, with conventional techniques, the structure reproducing the cooked muscle is obtained by complicated artifices which involve a large number of operations and always necessitate the presence of one or more binders capable of being thermally coagulated. Egg white is often used as binder which further increases the production costs.

The process according to the invention enables the production of analogs to be simplified, does not necessitate the presence of a binder and leads to products of which the appearance and, in particular, the cohesion and toughness properties, the colour, texture and flavour are comparable with those of cooked meat.

In the process according to the invention, the proteins are spun, the fibres obtained are subjected to a combined pressing and dehydrating operation in a mould, subsequently impregnated with a solution of aroma precursors and then sterilised in a container. This process is characterised in that, with the fibres arranged substantially parallel to one another in the mould, the combined pressing and dehydrating operation is carried out by subjecting the fibres to mechanical compression in the axial direction.

Spinning is carried out by the usual method, in which an alkaline protein-containing solution of suitable viscosity, or "dope", is prepared and subsequently passed through spinnerets into an acid coagulation bath to form the fibres. The proteins used may be of animal origin, such as casein, although they are preferably of vegetable origin, such as the proteins obtained from plants such as soya, turnsole, field beams, etc.

It is also possible to use a mixture of different proteins, for example proteins of soya and lactalbumin or casein, which leads to the formation of composite fibres.

The "dope" or solution to be spun generally has the following characteristics: its pH is in the range from 11 to 14 and preferably in the range from 12 to 13, its protein concentration amounts to between 5 and 20% and its temperature is in the range from 20° to 80° C. and preferably in the range from 25° to 40° C.

The alkaline agent used is normally a strong base, such as sodium or potassium hydroxide. The dwell time of the alkaline solution before entry into the spinneret should not be too long to avoid degradation of the proteins. It generally amounts to between 1 and 15 minutes.

The "dope" is with advantage previously deaerated under a pressure of from 30 to 50 mm Hg and freed from insoluble particles capable of blocking the spinnerets by filtration before being delivered to the spinnerets.

The coagulation bath is a conventional acid bath having a pH-value in the range from 0 to 3, the food-grade acid used being hydrochloric acid, phosphoric acid, citric acid, acetic acid or lactic acid, hydrochloric acid being preferred.

The bath generally contains salts such as the chlorides, phosphates or acetates of sodium or calcium, particularly sodium chloride. It is of advantage to circulate the coagulation bath in order to regenerate it and to standardise its pH-value and its salt content.

After coagulation, the fibres are with advantage subjected to an initial drawing operation carried out by passing the tow over orientable rollers rotating at a variable speed.

The tow is then washed with hot water, for example at 50° to 60° C. in order appreciably to reduce its salt content. During this operation, it undergoes hydration.

Washing is preferably followed by preliminary drying carried out for example by compressing the tow between pressing rollers and cylinders.

It has been found that a subsequent heat treatment carried out for a few minutes at a maximum temperature of 55° C. preferably around 35° C., is advantageous insofar as it facilitates the combined pressing and dehydrating operation. The temperature of the water should not exceed 55° C. because, beyond this temperature, the mechanical properties of the fibre are affected.

The tow is then advantageously neutralised by passing it through a buffer bath having a basis pH-value, for example of alkali bicarbonate, until the fibre has a pH-value of from 5 to 5.8. It is then wound onto tubes, the wound bundles being crosswound at a small crosswinding angle.

At this stage, the fibres have a dry matter content of at least 18%. The packages are then removed and packets of fibres are cut out. The fibres may be left standing for a maximum period of 3 hours before being subjected to the combined pressing and dehydrating operation in a mould, although it is preferred to treat the fibres in fresh form.

The mould is generally in the form of a rectangular parallelepiped, of which one of the faces is displaceable, for example to act as a piston which moves parallel to the small or large sides of the parallelepiped. For the pressing operation, the fibres are arranged substantially parallel to these sides of the parallelepiped, i.e. in the direction of the stroke of the piston, and the mould is filled, the fibres preferably having the length of the mould. When the piston moves, it compresses the fibres in the axial direction, thus giving them a zig-zag shape, which enables the fibres to overlap one another in the three dimensions whilst at the same time dehydrating them.

The pressing operation and its duration should be selected to permit a dehydration level such that the water content is below the "equilibrium" water content of the fibre.

The "equilibrium" content is the content for which the fibre neither exudes nor absorbs liquid. Thus, the water content of the fibres after pressing should be below about 71%, corresponding to a dry matter content of 29%.

The dry matter content of the pressed fibres preferably amounts to between 31 and 45%. These results are obtained with a pressure of from 250 to 450 kg/cm$^2$ applied for about 10 minutes.

The advantage of dehydrating the fibres to the level indicated above is that it enables the solution of aroma precursors to be absorbed into the very interior of the fibre during the subsequent impregnating operation.

The blocks of pressed fibres are then cut as required into slices, cubes, etc. The pressed and cut products are then brought into contact with a solution of aroma precursors.

The total quantity of precursors added is such that the total concentration of precursors in the impregnated product amounts to between 5 and 10% and preferably to between 5 and 7.5%, based on dry matter.

In order to obtain the aroma of cooked meat in the end product, it is possible to use any system of precursor compounds which are capable of reacting with one another by the Maillard reaction in the presence of a substance containing sulphur in sulphide form. By heating substances such as amino acids, peptides or proteins with saccharides, the Maillard reaction produces a browning at the same time as a development of aroma. Protein hydrolysates or yeast autolysates may be used as the amino acid source, the saccharides used are in general hexoses, such as glucose, or preferably pentoses, such as ribose or xylose.

One particularly advantageous saccharide source is provided by hydrolysates of vegetable fractions rich in polysaccharides containing acid groups, such as those described in published French patent application No. 2,318,596, which may with advantage replace the ribose or the xylose in the precursor formula.

The substance containing sulphur in sulphide form may be a substance in which the sulphur is in the —SH- state or at least one substance capable of generating —SH-groups during the Maillard reaction.

It may also be an alkaline hydrolysate of vegetable material rich in sulphur-containing derivatives, such as described in published French patent application No. 2,318,597. It is preferred to use cysteine.

The concentration of pentose and cysteine is with advantage from 1 to 2%. It has been found that, if the proportion of ose is increased relative to the cysteine, the end product is hardened and strengthened in colour. By contrast, a softening effect is obtained and the flavour of meat accentuated by increasing the proportion of cysteine.

The solution of precursors preferably contains additives, such as flavour strengtheners, particularly glutamic acid or its sodium salt, glutamine, inosine monophosphate, or buffers such as acid potassium phosphate.

The concentration of additives in the impregnated product advantageously amounts to between 4 and 8%, based on dry matter.

In a variant of the neutralising treatment of the fibre by passage through a bath, for example of alkali bicarbonate as indicated above, it is possible to add to the solution of aroma precursors a certain quantity of a food-grade alkali hydroxide, preferably sodium hydroxide, until the fibre has a pH-value of about 5.5

Impregnation with the solution of aroma precursors may be carried out for example by spraying on a granulating plate or on a conveyor belt.

The dry matter content of the products after impregnation amounts to between 25 and 40%.

The actual aromatising reaction takes place after the container, in the form of cans or bags, has been filled with the impregnated products. The container is then sealed, preferably in vacuo or after gassing in a nitrogen atmosphere, and subjected to a heat treatment for 15 minutes to 4 hours at a temperature of from 100° to 130° C. and preferably for 1 hour to 1.5 hours at a temperature of 120° C.

In one preferred embodiment, molten fat, preferably in the form of a mixture containing 10% of prime beef juice and 90% of a neutral fat, is added as transfer fluid to the pressed, impregnated product in its container before the sealing operation. The quantity of fat is added until the product is immersed. This introduction of juice enables the palatability of the product to be improved.

The invention is illustrated by but by no means limited to the following Examples in which the quantities and percentages quoted are by weight unless otherwise indicated.

EXAMPLE 1

Spinning of the fibres

A 15.9% dispersion in water of Promine R ®, a product of Central Soya, and a 7.65% sodium hydroxide solution are prepared. The dispersion and the solution are pumped through a heat exchanger at 66° C. into a Kenics mixer, after which the liquid obtained is immediately delivered to a vacuum de-aeration tower which supplies a viscous liquid cooled to 25°–35° C. After filtration through a 106-micron filter, this liquid is immediately passed through a spinneret comprising 5600 bores 180 microns in diameter which open into a bath containing 0.28% of hydrochloric acid and 12% of sodium chloride (pH 0.4). The dwell time in the alkaline medium is approximately 11.5 minutes. The fibres obtained are thoroughly washed with hot water at 55° C. until they have a pH-value of from 4.4 to 4.6, mechanically dried, treated with hot water at 35° C. for 10 minutes, passed through a buffer bath of 0.1% sodium bicarbonate until they have a pH-value of from 5.8 to 6.0 and wound onto tubes. The fibres have a dry matter content of from 19 to 21%.

Pressing-dehydration

After standing for 15 minutes, a packet of fibres 20 cm long is cut out and introduced vertically into a mould measuring 14×24×22 cm, the mould being filled without leaving any empty spaces. The upper horizontal surface of the mould is integral with a piston by means of which a vertical pressure of 350 kg/cm² is gradually applied in stages of 50 kg/minute. A block having a dry matter content of 34% is obtained.

Impregnation, packing, cooking

A solution of aroma precursors having the following composition:

| Compound | g |
|---|---|
| hydrolysate of cossettes | 40.83 |
| cysteine hydrochloride | 7.37 |
| glucose | 7.37 |
| monosodium glutamate | 18.15 |
| inosine monophosphate | 5.10 |
| sodium hydroxide | 4.45 |
| water | 240 | is prepared and mixed for about 4 minutes in a granulating plate with blocks of fibres cut into 1.5 cm cubes in a quantity of 7.4 g of dry matter of precursors per 100 g of dry matter of the fibres, after which 300 g of the impregnated product are introduced into 425 cc metal cans to which 10 g of prime beef juice and 90 g of hydrogenated fat are added, after which the cans are sealed.

The cans are placed in an autoclave in which they are heated for 1.5 hours at 120° C. and then opened. Tastings show that the analog obtained has a colour, a flavour and a texture entirely similar to those of boiled beef and that it is free from any soya flavour.

EXAMPLE 2

Spinning and pressing are carried out in the same way as in Example 1. The fibre cake is then cut into 150 g slices. The slices arranged on an endless belt are sprayed with the solution of aroma precursors. Adjustment of the speed of the belt and adjustment of the throughput of solution enable the quantity of precursors to be precisely measured. A quantity of 7.5 g/100 g of dry matter is normally used. The slices are then placed in a 200 g Steriflex ® bag, moistened with approximately 75 g of the mixture of molten fat as indicated in Example 1 and then sterilised for 1 hour 15 minutes at 120° C. (temperature of the heating water). An imitation of braised beef is obtained which, for several months at ambient temperature, keeps its flavour and its texture which are entirely comparable with those of real beef whilst, at the same time, being free from any soya flavour.

EXAMPLE 3

The procedure is as in Example 1 using the following mixtures of aroma precursors:

|  | A | B | C | D | E |
|---|---|---|---|---|---|
| Concentration (%) | 5 | 7.5 | 10 | 5 | 5 |
| Composition (g) | | | | | |
| ribose | 4.96 | 7.44 | 9.92 | 3.65 | 4.96 |
| cysteine | 3.58 | 5.37 | 7.16 | 2.63 | 3.58 |
| glucose | 3.58 | 5.37 | 7.16 | — | — |
| alanine | 1.37 | 2.06 | 2.74 | — | 1.37 |
| glutamic acid | 4.96 | 7.44 | 9.92 | — | 4.96 |
| glutamine | 2.48 | 3.72 | 4.96 | — | 2.48 |
| inosine monophosphate | 2.48 | 3.72 | 4.96 | — | 2.48 |
| NaCl | 2.48 | 3.72 | 4.96 | — | 2.48 |
| K₂HPO₄ | 1.37 | 2.06 | 2.74 | — | 1.37 |
| water | 88.00 | 88.00 | 88.00 | 65.00 | 88.00 |
| solution added (g) per 100 g of pressed cube | 6.78 | 7.58 | 8.38 | 5.70 | 6.57 |

Tastings show that the analogs obtained in this way are similar in colour, flavour and texture to boiled beef and are free from any soya flavour.

EXAMPLE 4

The procedure is as in Example 3, B (sample I) and the texture is examined by comparison with an analog prepared in the same way as in Example 3, B, except for the fact that the fibres are arranged horizontally in the mould for the combined pressing and dehydrating operation (sample II), and with commercially available tinned cooked beef (sample III).

The texture is examined from three main aspects: toughness, cohesion and breaking strain.

The methods used are as follows:

Toughness

Toughness is measured by means of an INSTRON ® tester equipped with a 10-blade Kramer cell. The sample is enclosed in the cell and subjected to the compression-shearing effect of the 10 blades attached to the compression piston. The force required to reduce the samples into fragments under the test conditions is recorded and constitutes the result.

Cohesion

Cohesion is measured by dilaceration in an INSTRON ® tester. The sample is fixed to a needle clamp, the fibres being oriented perpendicularly of the direction of the tractive force. The sample is then drawn until it breaks. The maximum height of the peak recorded indicates the cohesion force of the sample whilst the energy used for dilaceration indicates the breaking strain.

Results

| | | Toughness kg/g sample | Cohesion force g/g sample | Breaking strain $10^{-10}$ joule/g sample |
|---|---|---|---|---|
| I. | beef analog (fibres arranged perpendicularly of the surface of the piston | 5 | 52.5 | 140 |
| II. | beef analog (fibres arranged parallel to the surface of the piston) | 5 | 32.5 | 25 |
| III. | commercially available tinned cooked beef | 2.4 | 35 ± 9.5 | —* |

*not measured

It can be seen that cohesion is distinctly improved by compressing the fibres in the axial direction relative to the lateral compression without any change in toughness.

Test were carried out with impregnation of the tow after mechanical drying by passages through a serum bath containing 15% of egg white together with the usual additives, spices, colorants, vegetable oil aroma. The cohesion obtained amounted to between 12 and 16 g per g of sample, whilst the toughness obtained amounted to between 7 and 11 kg per g of sample.

Example 5

Results similar to those of Examples 1 to 3 are obtained with the following composite fibres:

| Protein of the fibre % | Promine R ® | Lactalbumin | Casein |
|---|---|---|---|
| | 60 | 40 | — |
| | 75 | — | 25 |
| | 85 | — | 15 |
| | 90 | — | 10 |

We claim:
1. A process for the production of a textured protein-containing edible product resembling cooked meat from a fibrous protein material without the use of a binder comprising:
   (a) spinning the proteins and passing the spun proteins through a coagulation bath to form a tow of fibers;
   (b) arranging the fibers in a mold to orient them substantially parallel to one another;
   (c) subjecting the fibers while in the mold to a combined pressing and dehydrating step by applying mechanical compression to the fibers in the axial direction such that pressure is transmitted in a direction along the length of the fibers;
   (d) removing blocks of pressed fibers from the mold;
   (e) impregnating the pressed fibers with a solution of aroma precursors; and then
   (f) sterilizing the impregnated fibers in a container.
2. A process as claimed in claim 1, wherein the fibers contain at least 60% by weight of soya proteins.
3. A process as claimed in claim 2, wherein the fibers contain approximately 40% by weight of lactalbumin and approximately 60% by weight of soya proteins.
4. A process as claimed in claim 2, wherein the fibers contain from 75 to 90% by weight of soya proteins for 25 to 10% by weight of casein.
5. A process as claimed in claim 1, wherein after spinning, the tow is washed with water at a temperature of at most 55° C. for a period of about 10 minutes.
6. A process as claimed in claim 1 or 5, wherein the tow is neutralized by passage through a buffer bath having a basic pH-value until the fiber has a pH-value of from 5 to 5.8.
7. A process as claimed in claim 1 or 5, wherein the fibers are left standing for at most 3 hours before being subjected to the combined pressing and dehydrating operation.
8. A process as claimed in claim 1 or 5, wherein the mold is in the form of a rectangular parallelepiped of which one of the faces is displaceable to act as a piston which moves parallel to the small or large sides of the parallelepiped, and the mold is completely filled by arranging the fibers substantially parallel to these sides such that the longitudinal axis of the fibers are in the direction of the stroke of the piston.
9. A process as claimed in claim 8, wherein the fibers are axially compressed for about 10 minutes under a pressure of from 250 to 450 kg/cm$^2$, the dry matter content of the fibers after pressing being greater than 29% by weight.
10. A process as claimed in claim 1 or 5, wherein the blocks of pressed fibers are cut to the required shape and then impregnated with a solution of aroma precursors in such a quantity that the total concentration of precursors in the impregnated product amounts to between 5 to 10% by weight, based on dry matter.
11. A process as claimed in claim 1 or 5, wherein the solution of aroma precursors contains at least one saccharide, a compound containing nitrogen in amino form and a compound containing sulphur in sulphide form.
12. A process as claimed in claim 4, wherein the solution of aroma precursors contains a pentose and/or a hexose, the concentration of the pentose and hexose amounting to between 1 and 2% of weight, based on dry matter.
13. A process as claimed in claim 11, wherein the solution of aroma precursors contains as saccharide a hydrolysate of vegetable fractions rich in polysaccharides containing acid groups.
14. A process as claimedin claim 11, wherein the solution of aroma precursors also contains additives, such as flavour strengtheners, particularly glutamic acid or its sodium salt, glutamine, inosine monophosphate and buffer salts, such as acid potassium phosphate, the concentration of additives in the impregnated product amounting to between 4 and 8% by weight, based on dry matter.
15. A process as claimed in claim 1 or 5, wherein the impregnated products are placed in containers, the container is sealed in vacuo or after gassing in a nitrogen atmosphere, and then subjected to a heat treatment for 15 minutes to 4 hours at a temperature of from 100° to 130° C.
16. A process as claimed in claim 1, wherein molten fat, in the form of a mixture containing approximately 10% by weight of prime beef juice and approximately 90% by weight of a hydrogenated neutral fat, is added to the impregnated product in its container before the sealing operation.
17. A product obtained by carrying out the process according to claim 1.
18. A process as claimed in claim 15, wherein the container is subjected to a heat treatment for 1 hour to 1.5 hours at a temperature of 120° C.
19. A process as claimed in claim 5, wherein the tow is washed with water at a temperature of about 35° C.
20. A process as claimed in claim 6, wherein the tow is neutralized by passage through a bath of alkali bicarbonate.
21. A process as claimed in claim 9, wherein the dry matter content of the fibers after pressing is from 31 to 45% by weight.
22. A process as claimed in claim 10, wherein the total concentration of precursors in the impregnated product amounts to between 5 and 7.5% by weight, based on dry matter.
23. A process as claimed in claim 12, wherein the pentose is ribose or xylose and the hexose is glucose or cysteine.
24. A process as claimed in claim 13, wherein the solution of aroma precursors contains a hydrolysate of cossettes.

* * * * *